(12) United States Patent
Lu et al.

(10) Patent No.: US 10,534,975 B1
(45) Date of Patent: Jan. 14, 2020

(54) MULTI-FREQUENCY HIGH-PRECISION OBJECT RECOGNITION METHOD

(71) Applicants: Kuan-Yu Lu, Taipei (TW); Wei-Hsin Huang, Taipei (TW); Wei-Hung Chang, Taipei (TW); Chun-Shing Chu, Taipei (TW)

(72) Inventors: Kuan-Yu Lu, Taipei (TW); Wei-Hsin Huang, Taipei (TW); Wei-Hung Chang, Taipei (TW); Chun-Shing Chu, Taipei (TW)

( * ) Notice: Subject to any disclaimer, the term of this patent is extended or adjusted under 35 U.S.C. 154(b) by 20 days.

(21) Appl. No.: 16/031,473

(22) Filed: Jul. 10, 2018

(51) Int. Cl.
| G06K 9/46 | (2006.01) |
| G06K 9/00 | (2006.01) |
| G06K 9/68 | (2006.01) |
| G06T 17/20 | (2006.01) |
| G06T 5/50 | (2006.01) |
| G06T 7/20 | (2017.01) |
| G06T 7/521 | (2017.01) |

(52) U.S. Cl.
CPC ....... *G06K 9/4661* (2013.01); *G06K 9/00288* (2013.01); *G06K 9/68* (2013.01); *G06T 5/50* (2013.01); *G06T 7/20* (2013.01); *G06T 7/521* (2017.01); *G06T 17/20* (2013.01); *G06T 2207/10048* (2013.01)

(58) Field of Classification Search
CPC ......... G06T 2207/10028; G06T 7/0012; G06T 7/11
USPC ....... 382/103, 141, 154, 164, 170, 224, 278; 358/537, 538, 463
See application file for complete search history.

(56) References Cited

U.S. PATENT DOCUMENTS

| 5,936,726 A * | 8/1999 | Takeda | G01N 21/94 356/237.2 |
| 7,342,652 B2 * | 3/2008 | Urano | A61B 5/0073 356/39 |
| 7,504,647 B2 * | 3/2009 | Amar | G01N 21/9501 250/201.2 |
| 8,311,342 B2 * | 11/2012 | Schopp | G06K 9/685 382/224 |
| 8,368,647 B2 * | 2/2013 | Lin | G06F 3/014 345/158 |
| 8,716,641 B2 * | 5/2014 | Matsumoto | G01N 21/645 250/201.4 |

* cited by examiner

*Primary Examiner* — Yosef Kassa
(74) *Attorney, Agent, or Firm* — Chun-Ming Shih; HDLS IPR Services

(57) ABSTRACT

A multi-frequency high-precision object recognition method is disclosed, wherein a multi-frequency light emitting unit is used to emits lights of different frequencies onto an object-to-be-tested, and a multi-frequency image sensor unit is used to fetch the image of lights reflected from the object-to-be-tested. In an X axis and a Y axis is a single-piece planar image, while lights of different frequencies is used to form image depth in a Z axis. The sample light in the Z axis includes two infrared light narrow range image signals, each having wavelength between 850 nm and 1050 nm, and wavelength width between 10 nm and 60 nm. Calculate to obtain a plurality of single-piece planar images in the X axis and the Y axis as sampled by different wavelength widths in the Z axis, superimpose the plurality of single-piece planar images into a 3-dimension stereoscopic relief image for precise comparison and recognition.

11 Claims, 8 Drawing Sheets multi-layer superimposed 3-D stereoscopic relief image obtained through sampling by infrared lights of wavelength 850 nm and 940 nm

MULTI-FREQUENCY HIGH-PRECISION OBJECT RECOGNITION METHOD

BACKGROUND OF THE INVENTION

Field of the Invention

The present invention relates to an image recognition technology, and in particular to a multi-frequency high-precision object recognition method, that is simple in operation, and is capable of producing high-quality, 3-dimension stereoscopic relief images through superimposing images, for precise comparison and recognition.

The Prior Arts

In general, image sensor is mainly used to obtain planar images through photoelectrical conversion. As such, image sensors are used extensively in the various products of security monitoring, industrial monitoring, face recognition, webcam, drone, robot, and vehicle backup auxiliary image fetching.

In particular, in the application of face recognition, it has the advantages of nature, convenience, and non-contact, such that the objective of recognition is realized without affecting and disturbing the normal activities of the people involved. In this age of Internet and intelligent mobile devices, face recognition is getting more important. In this sphere, it has made great progress in recent years, and it has been used in the sphere of identity recognition, data security control, financial payment, medical applications, and visual monitoring.

Presently, a more advanced face recognition technology is developed through using the following two 3-dimension stereoscopic image sensing technologies:

1. The Time of Flight (TOF) approach, wherein, infrared light is irradiated on to the surface of an object and is reflected back. Since the speed of light (v) is known, and infrared image sensor can be used to measure the time of reflection (t) from the different positions of different depths on the surface of the object-to-be-tested. Then, a simple mathematic formula is used to calculate the distances and depths to the different positions on the surface of the object-to-be-tested.

2. The Structured Light approach: wherein different light patterns are produced by special light sources, to incident onto the surface of an object. The distorted light patterns produced by reflections from different depths at different positions on the surface of an object are used for recognition. For example, the most advanced iPhone X intelligent handset makes use of a Dot Projector. A high power vertical resonance cavity surface-emitting laser is used to emit infrared laser light. Then, the laser light travels through the Wafer Level Optics (WLO), the Diffractive Optical Elements (DOE), to produce about 30 thousand Structured Light spots, to be projected onto the face of a user. Subsequently, the array formed by the light spots is reflected back to an Infrared camera, to measure the distances to the depths of the different positions on the face of the user.

Refer to FIG. 10, in order to combine effectively the two approaches mentioned above to raise precision of face recognition, the most advanced iPhone X intelligent handset is utilized. In this respect, it basically requires the following devices to achieve face recognition: an infrared lens a1, a seven-million-pixel lens a2, a flood illuminator a3, a proximity sensor a4, an ambient light sensor a5, and a dot projector a6. The disadvantages of this design are that it requires to use quite a lot of devices to cause high cost, while it occupies a rather large space.

More seriously, even it can afford to use the high price precision elements mentioned above to produce 30 thousand structured light spots, to be projected onto the face of the user; yet its recognition effect is liable to be affected by the variations of the ambient lights, to cause marked variations for the characteristic signals obtained through fetching face images. This in turn could lead to errors in the subsequent comparisons of the face image signals, and reduced precision for the face characteristic comparisons, to adversely affect the accuracy of face recognition.

The shortcomings mentioned above could be found not only in intelligent handset, but also in other devices making use of the same face recognition technology. Yet, in the Prior Art, those shortcomings have not been effectively overcome.

Therefore, presently, the design and performance of the face and object recognition technology is not quite satisfactory, and it leaves much room for improvement.

SUMMARY OF THE INVENTION

In view of the problems and drawbacks mentioned above, the present invention provides a multi-frequency high-precision object recognition method, to overcome the shortcomings of the Prior Art.

The objective of the present invention is to provide a multi-frequency high-precision object recognition method, comprising the following steps:

Providing a recognition hardware mechanism contained in a recognition system, the recognition hardware mechanism having at least a multi-frequency light emitting unit and at least a multi-frequency image sensor unit.

Irradiating lights of different frequencies emitted by the at least a multi-frequency light emitting unit onto an object-to-be-tested, the light emitted by the multi-frequency light emitting unit contains at least two infrared lights, having their wavelength ranges between 850 nm to 1050 nm.

Fetching by the multi-frequency image sensor unit images of the object-to-be-tested irradiated by lights of different frequencies, such that the multi-frequency image sensor unit fetches respective narrow range image signals contained in at least two reflected infrared lights respectively, the wavelength ranges of the narrow range image signals are between 850 nm to 1050 nm corresponding to that of the multi-frequency light emitting unit, and a wavelength width for each of the infrared lights is at least 10 nm to 60 nm.

Locating in an X axis and a Y axis is a single-piece planar image, and in a Z axis is image depths of different wavelengths, wherein a sample wavelength in the Z axis contains at least two infrared light narrow range image signals, and their wavelength ranges are between 850 nm and 1050 nm, corresponding to that of the multi-frequency image sensor unit, the wavelength width for each of the infrared lights is at least 10 nm to 60 nm.

Calculating to obtain a plurality of single-piece planar images in the X axis and the Y axis as sampled by different wavelength widths in the Z axis, superimposing the plurality of single-piece planar images into a 3-dimension stereoscopic relief reference image for precise comparison and recognition.

For the characteristics mentioned above, the present invention can be used in the following applications: security monitoring, industrial monitoring, human face recognition, image recognition for door opening of a vehicle. In particular, when it is used in an intelligent mobile device, it requires less components to function, to save cost and space significantly. In addition, in application, it is able to fetch 3-dimension stereoscopic relief images precisely at high speed, without being affected by the variations of the ambient lights. Therefore, the major advantage of the present invention is that, it is able to raise the precision of human face recognition.

In the Prior Art, high price precision elements are used to produce special effect structured light, to be irradiated onto the object-to-be-tested. Yet, due to its technical limitations, it may only use ordinary image sensor to receive light, as such it is liable to be affected by the variations of the ambient lights, to cause inferior quality of the image produced. Therefore, even if the Structured Light is used in cooperation with the Time of Flight (TOF) technology in the subsequent step to produce 3-dimension stereoscopic relief images, the overall recognition effect is not sufficient, to result in marked reduction of recognition precision.

In contrast, in the present invention, the low price multi-frequency light emitting units can be used to irradiate flood lights onto the object-to-be-tested. Then, the multi-frequency image sensor unit capable of producing clear 3-dimension stereoscopic image of front layer and back layer is used, such that the received image having clear front layer and back layer is less liable to be affected by the variations of the ambient lights. Subsequently, calculate to obtain a plurality of single-piece planar images in the X axis and the Y axis as sampled by different wavelength widths in the Z axis, and superimpose the plurality of single-piece planar images into a 3-dimension stereoscopic relief image for precise comparison and recognition. As such, the recognition effects for both the biological and non-biological real entities are improved significantly, and are much better than that of the Prior Art.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detail descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

Figure 1:
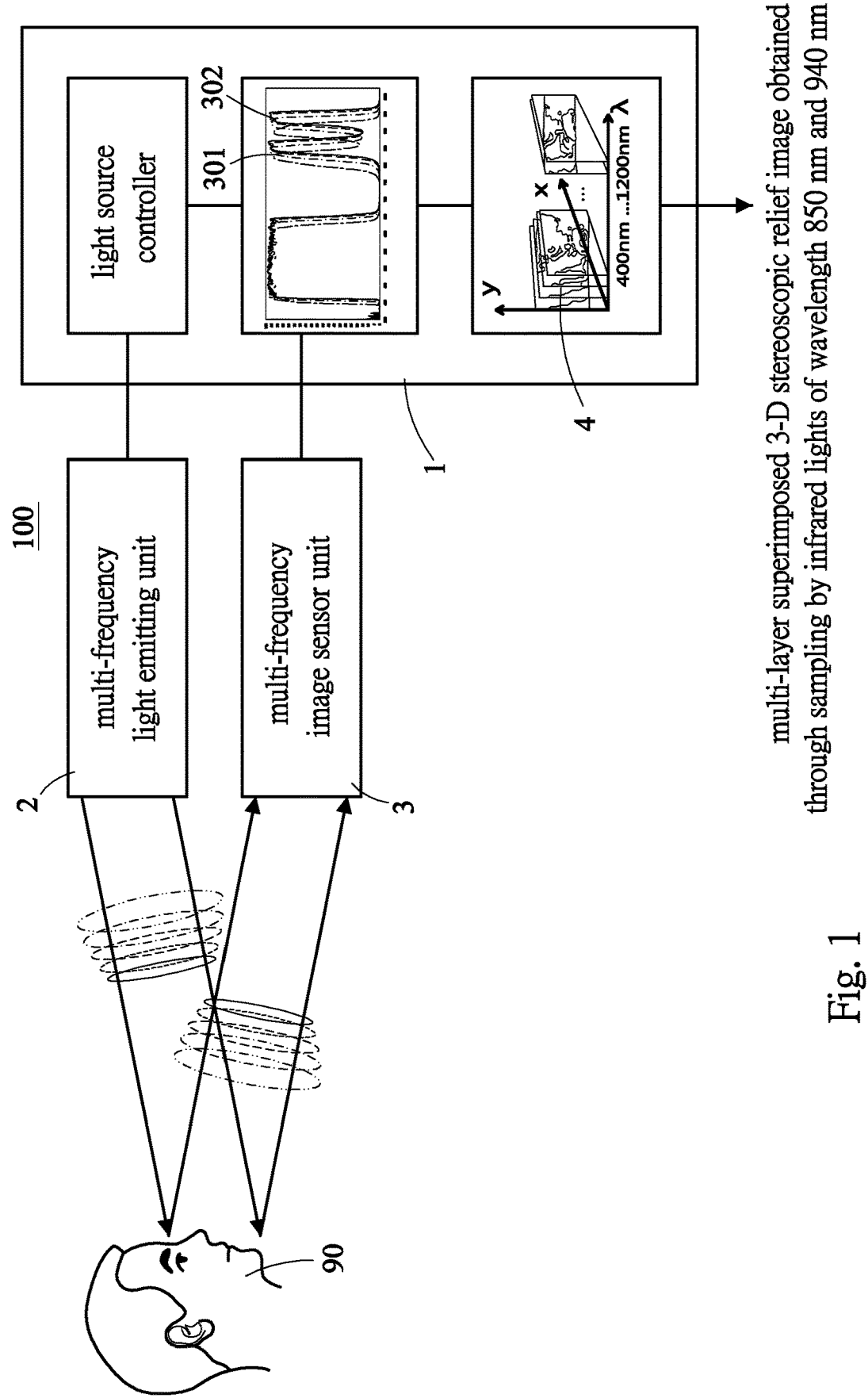
FIG. 1 is a schematic diagram of a recognition system according to the present invention.

The purpose, construction, features, functions and advantages of the present invention can be appreciated and understood more thoroughly through the following detailed descriptions with reference to the attached drawings.

Refer to FIGS. 1 to 5 respectively for a schematic diagram of a recognition system according to the present invention; a schematic diagram of a 3-dimension stereoscopic relief images produced by a multi-frequency high-precision object recognition method according to the present invention; a block diagram of a recognition system according to the present invention; a schematic diagram of a single-piece multi-frequency image sensor according to the present invention; and a spectrum diagram of image signals received by a single-piece multi-frequency image sensor according to the present invention. As shown in FIGS. 1 to 5, the multi-frequency high-precision object recognition method of the present invention includes the following steps:

Providing a recognition hardware mechanism 1 contained in a recognition system 100, with the recognition hardware mechanism 1 having at least a multi-frequency light emitting unit 2 and at least a multi-frequency image sensor unit 3.

Irradiating lights of different frequencies emitted by the at least a multi-frequency light emitting unit 2 onto an object-to-be-tested 90, the lights emitted by the multi-frequency light emitting unit 2 contains at least two infrared lights, having their wavelength ranges between 850 nm to 1050 nm.

Fetching by the multi-frequency image sensor unit 3 images of the object-to-be-tested 90 irradiated by lights of different frequencies, such that the multi-frequency image sensor unit 3 fetches respective narrow range image signals 301, 302 contained in the at least two reflected infrared lights respectively, the wavelength ranges of the narrow range image signals 301, 302 are between 850 nm to 1050 nm corresponding to that of the multi-frequency light emitting unit 2, and a wavelength width for each of the infrared lights is at least 10 nm to 60 nm.

Locating in an X axis and a Y axis is a single-piece planar image, and in a Z axis is image depths of different wavelengths, wherein a sample wavelength in the Z axis contains at least two infrared light narrow range image signals 301, 302, and their wavelength ranges are between 850 nm and 1050 nm, corresponding to that of the multi-frequency image sensor unit 3, the wavelength width for each of the infrared lights is 10 nm to 60 nm.

Figure 2:
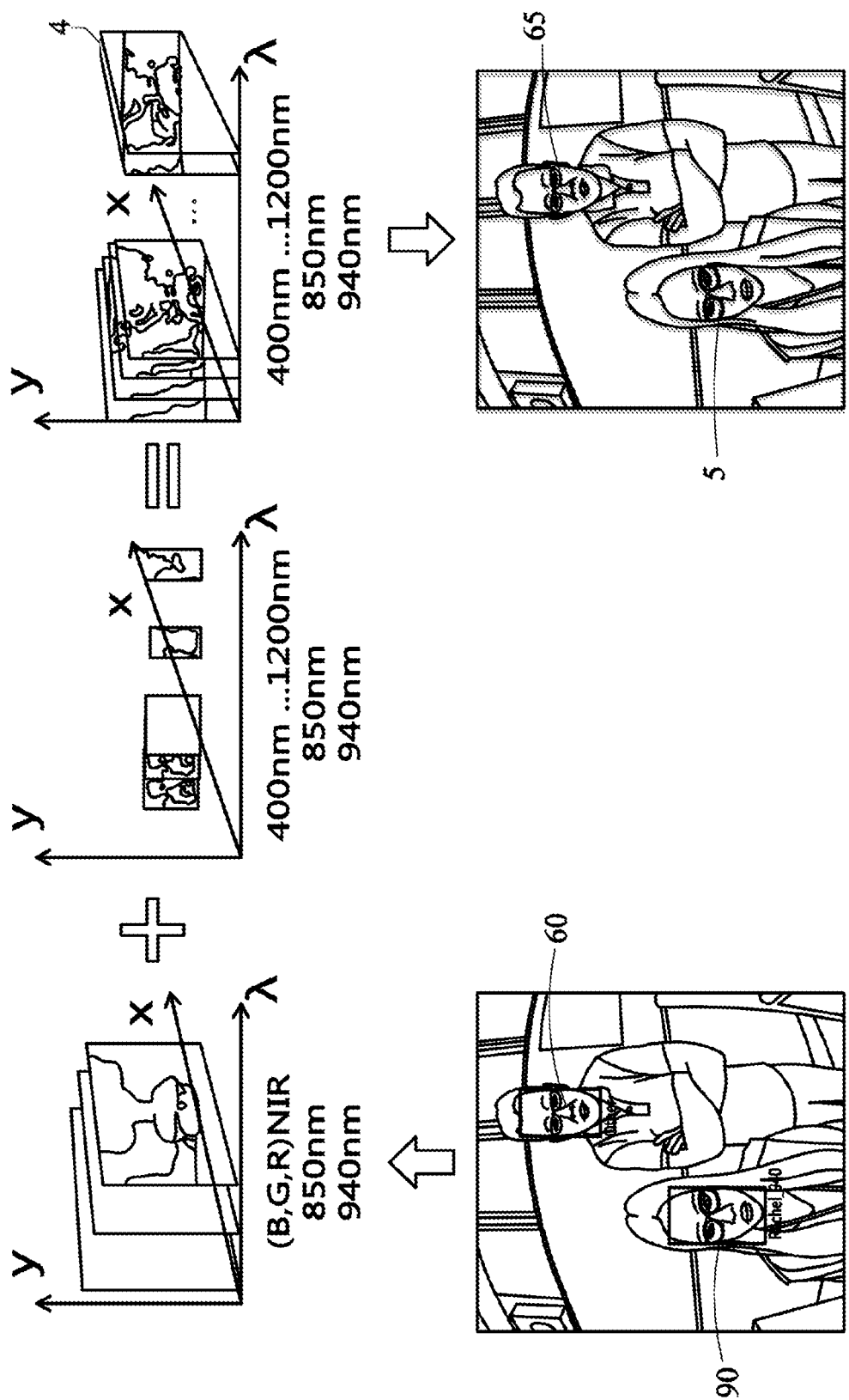
FIG. 2 is a schematic diagram of a 3-dimension stereoscopic relief images produced by a recognition method according to the present invention.

As shown in FIG. 2, calculating to obtain a plurality of single-piece planar images 4 in the X axis and the Y axis as sampled by different wavelength widths in the Z axis, superimposing the plurality of single-piece planar images 4 into a 3-dimension stereoscopic relief image 5 for precise comparison and recognition.

Figure 3:
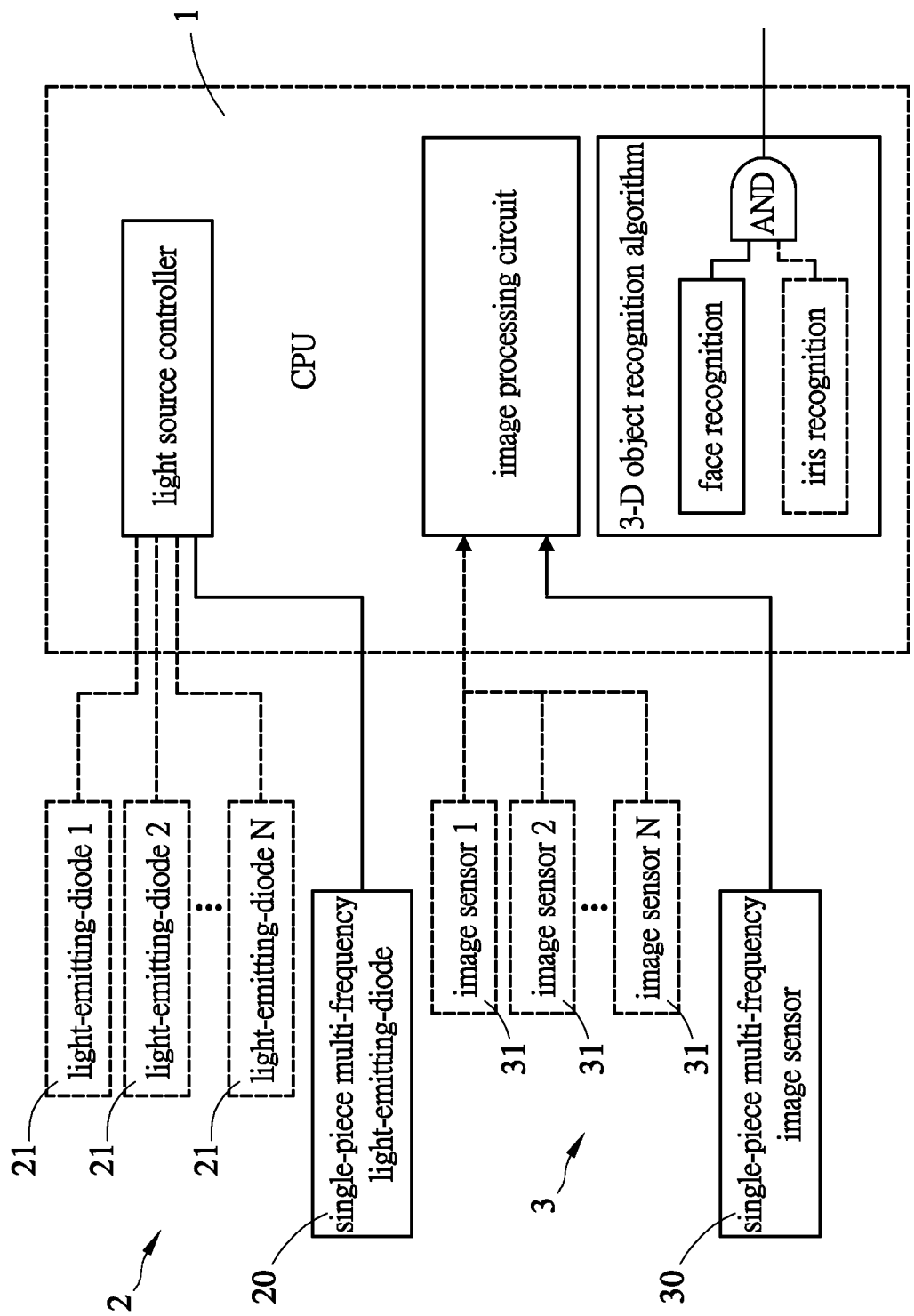
FIG. 3 is a block diagram of a recognition system according to the present invention.

As shown in FIG. 3, the multi-frequency light emitting unit is formed by a plurality of light-emitting-diodes 21 of different frequencies or a single-piece multi-frequency light-emitting-diode 20, the single-piece multi-frequency lightemitting-diode 20 emits two infrared lights having their wavelength ranges between 850 nm and 1050 nm. Preferably, the two infrared lights are of wavelength 850 nm and 940 nm respectively, or alternatively of wavelength 940 nm and 1050 nm respectively. Also, as shown in FIG. 3, the light-emitting-diodes 21 (1, 2, . . . N), and the single-piece multi-frequency light-emitting-diode 20 are connected to a light source controller for switching. While image sensor 31 (1, 2, . . . N), and the single-piece multi-frequency image sensor 30 are connected to an image processing circuit. The light source controller and the image processing circuit belong to the Prior Art, and thus they will not be described in detail herein for brevity.

Figure 4:
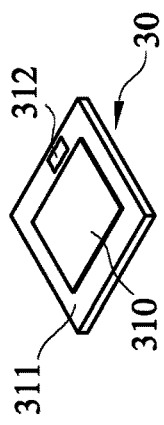
FIG. 4 is a schematic diagram of a single-piece multi-frequency image sensor according to the present invention.
Figure 5:
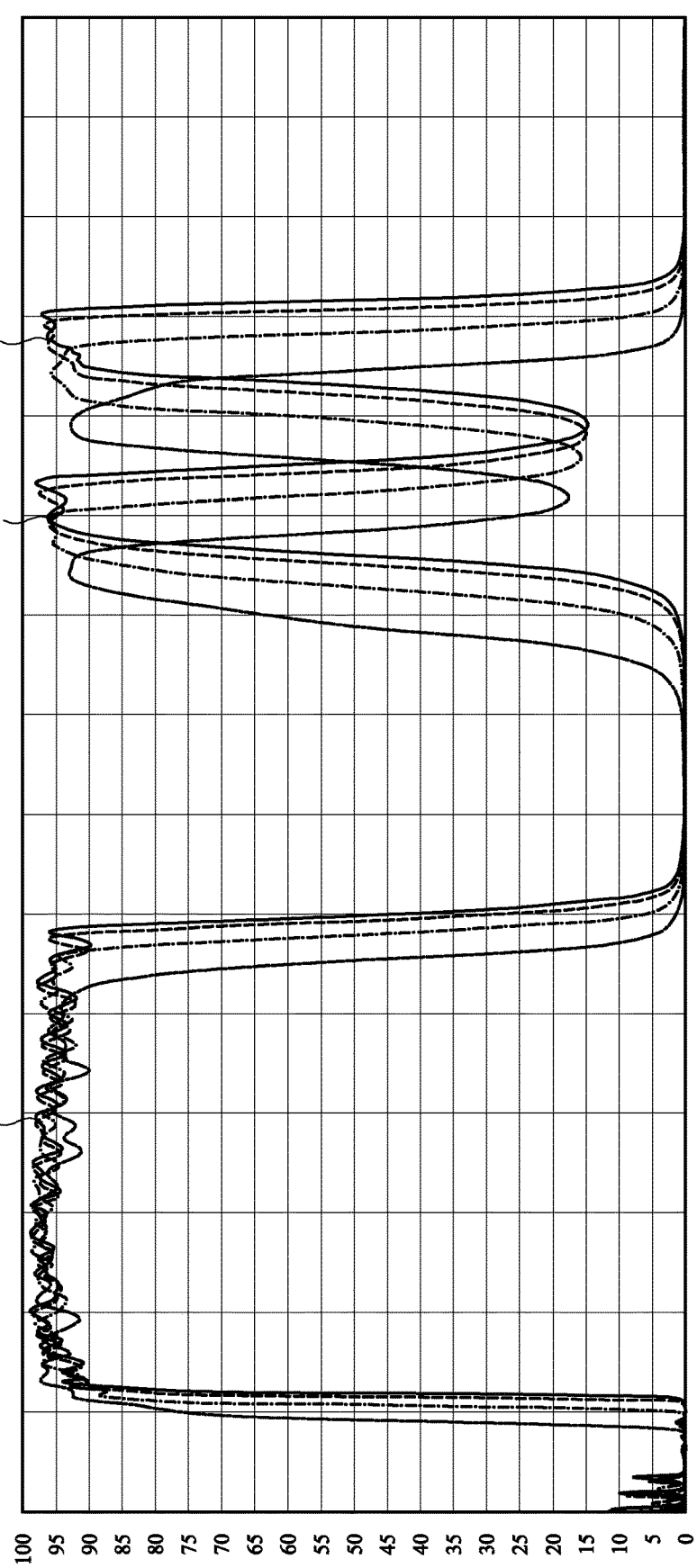
FIG. 5 is a spectrum diagram of image signals received by a single-piece multi-frequency image sensor according to the present invention.

As shown in FIGS. 3-5, the multi-frequency image sensor unit 3 is formed by a plurality of image sensors 31 of different frequencies or a single-piece multi-frequency image sensor 30. The single-piece multi-frequency image sensor 30 includes: a light sensing pixel array 310; a packaging circuit 311, and an image enhancing processor unit 312. The a packaging circuit 311 is connected to the light sensing pixel array 310, to drive the light sensing pixel array 311 to capture outside light and convert it into a combined image signal for output, the light sensing pixel array 310 captures RGB full color visible light, and IR infrared invisible light to perform photoelectric conversion. The image enhancing processor unit 312 is embedded in the packaging circuit 311, to control and regulate image captured by the light sensing pixel array 310. The image includes: a full color RGB visible light wide range image signal 305 having its wavelength range between 400 nm and 700 nm, and at least two infrared invisible light narrow range image signals 301, 302 having their wavelength ranges between 850 nm and 940 nm. The wavelength width for each of the infrared invisible light narrow range image signals 301,302 is between 10 nm and 60 nm. The full color RGB visible light wide range image signal 305 and the two infrared invisible light narrow range image signals 301, 302 are superimposed and combined, to produce a clear output image having a stereoscopic sense of a front layer and a back layer.

Since the combined image signal output is formed by superimposing two infrared light narrow range image signals 301,302, having their wavelength ranges between 850 nm and 1050 nm, so that the recognition effect achieved is far better than that of the Prior Art. Also, the clearness and stereoscopic sense of layer are raised. In this way, the single-piece multi-frequency image sensor 30 can be used to capture the images clearly, while being less liable to be affected by the variations of the ambient lights, to achieve the objective of image recognition.

In the descriptions above, the object-to-be-tested 90 can be a human face, and that is used quite often in face recognition turn-on of a mobile device, or face recognition turn-on of an automatic payment device.

Figure 6:
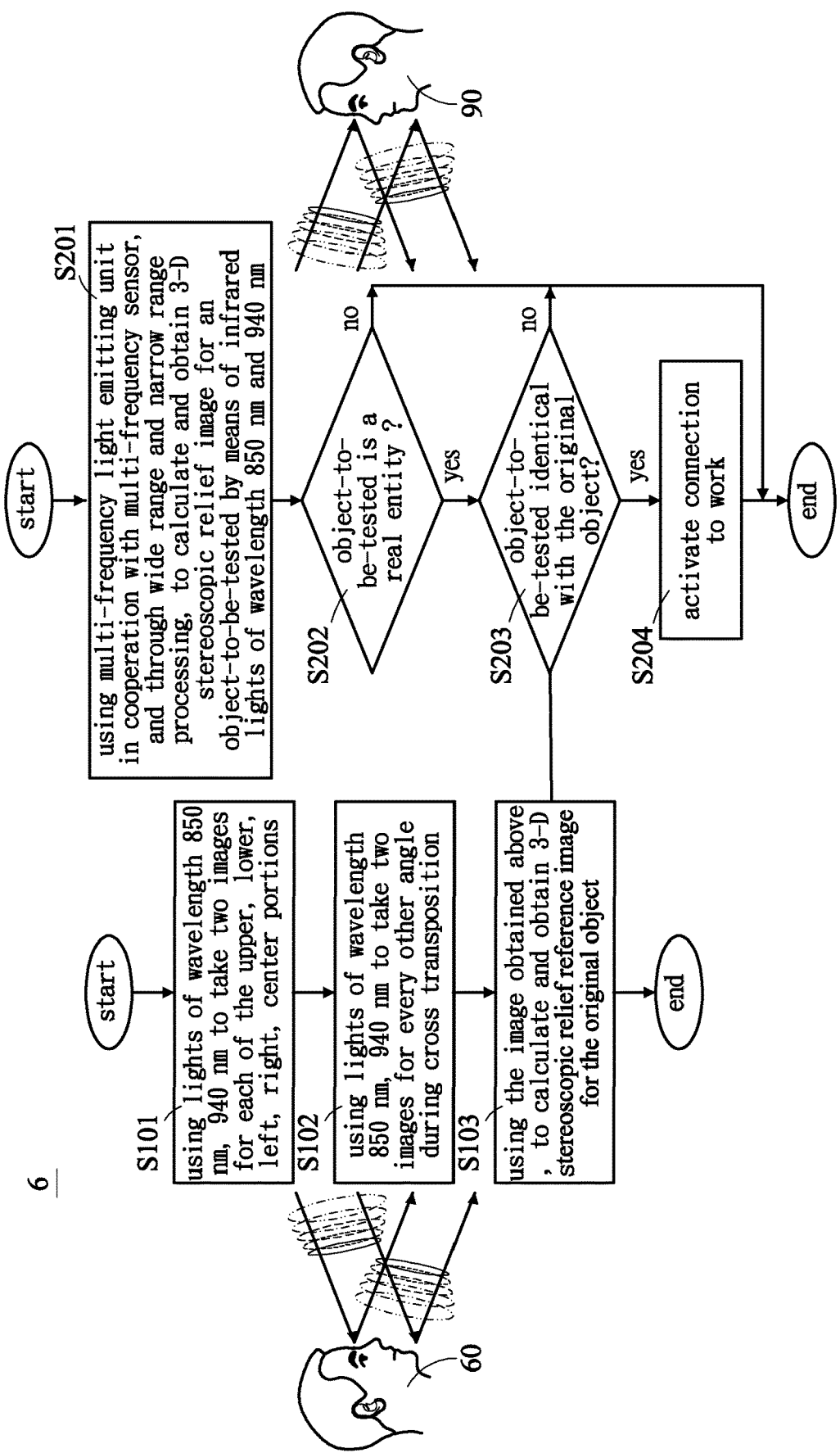
FIG. 6 is a flowchart of steps of the recognition method for recognizing human face according to the present invention.

As shown in FIG. 6, in implementing the recognition method of the present invention, a preliminary recognition learning unit 6 is provided, to choose the wavelengths of the two infrared lights emitted by the multi-frequency light emitting unit 2 to be 850 nm and 940 nm respectively. In step S101, utilizing two infrared lights having wavelengths 850 nm and 940 nm respectively to each take an image for the upper portion, the lower portion, the center portion, the left portion, and the right portion of the original object 60 (namely, a total of two images for each of the portions). In step S102, in the cross transposition movement of the original object 60, utilizing two infrared lights having frequencies 850 nm and 940 nm respectively to take at least an image for every other angle (namely, a total of two images for every other angle). In step S103, calculate to obtain a plurality of single-piece planar images 4 in the X axis and the Y axis as sampled by infrared lights of different wavelengths of 850 nm and 940 nm respectively in the Z axis, and superimpose the plurality of single-piece planar images 4 to produce a 3-dimension stereoscopic relief reference image 65 of the original object 60 for precise comparison and recognition.

In the descriptions above, in executing a preliminary recognition learning unit 6, an interrupted sound or voice can be produced, to serve as a reference indication for angular displacement speeds of the original object 60 moving upward, downward, to the center, to the left, and to the right.

Upon finishing filing the 3-dimension stereoscopic relief reference image 65 of the original object 60, in step S201, when the recognition system 100 executes recognition of the object-to-be-tested 90 to obtain the 3-dimension stereoscopic relief image 5, in step S202, determine if the object-to-be-tested 90 is an organic or inorganic real entity. In case the answer is positive, in step S203, the 3-dimension stereoscopic relief image 5 is compared with, the 3-dimension stereoscopic relief reference image 65 of the original object 60 stored in the preliminary recognition learning unit 6. Finally, in step S204, in case the former and the latter are identical, then activate the connection to work, otherwise, the connection is not activated. The technic mentioned above can be applied in face recognition turn-on of a handset, face recognition turn-on of an automatic payment mechanism, or other applications in this respect.

Figure 7:
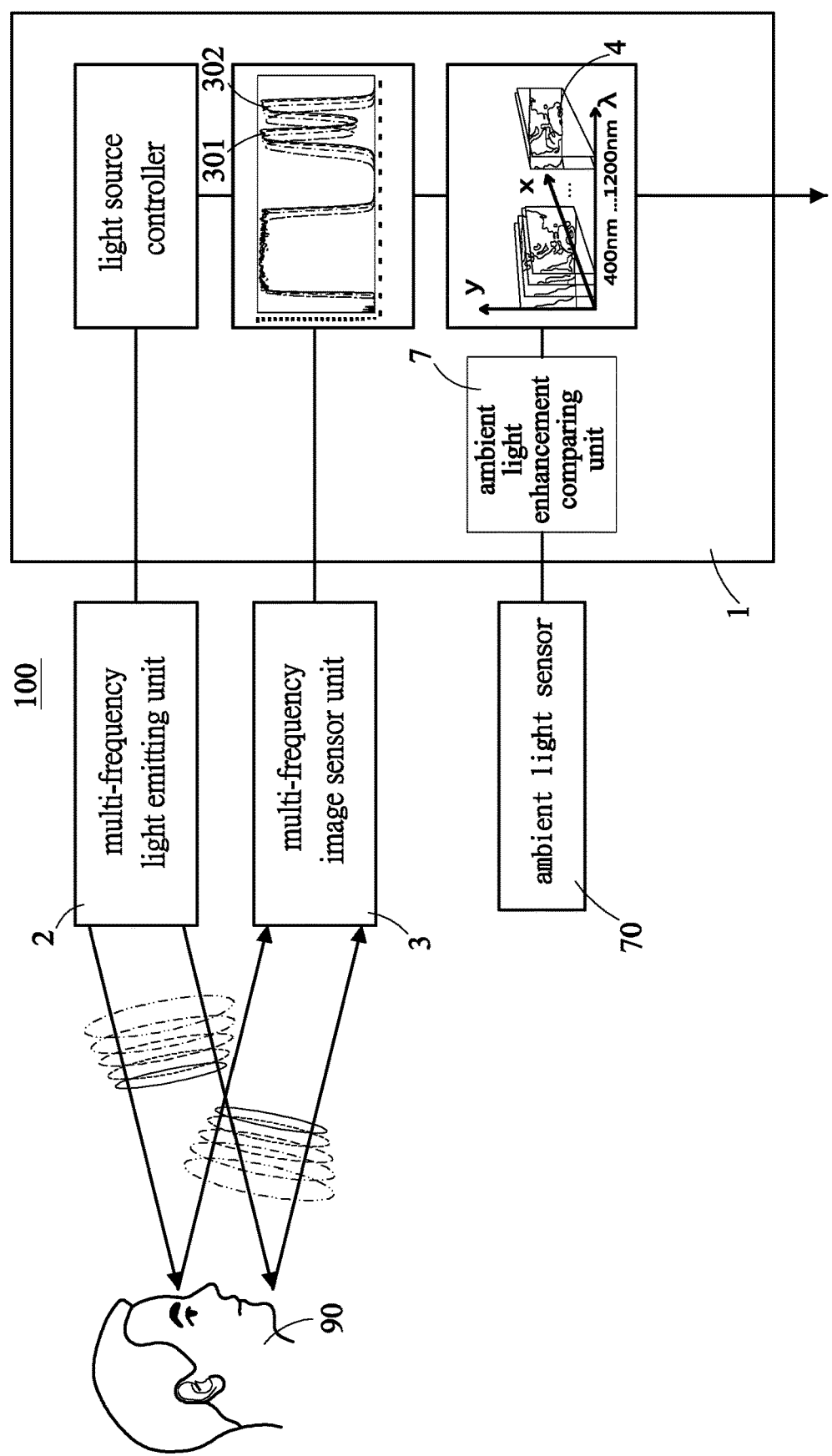
FIG. 7 is a schematic diagram of a recognition system having an added ambient light sensor according to the present invention.
Figure 10:
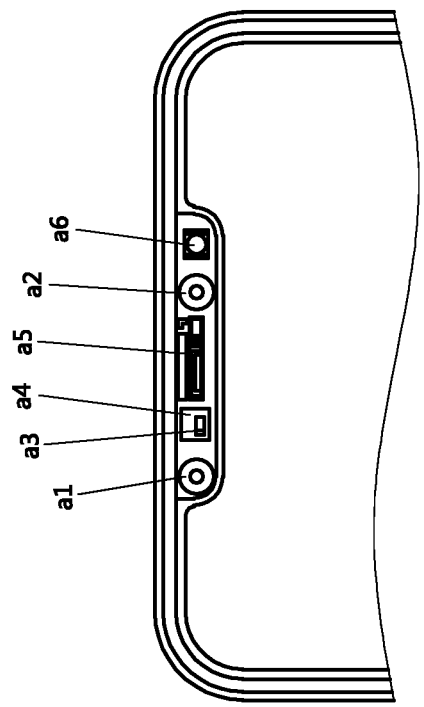
FIG. 10 is a schematic diagram of an Apple iPhone X equipped to perform human face recognition according to the Prior Art.

As shown in FIG. 7, the recognition system 100 further includes an ambient light sensor 70 and an ambient light enhancement comparing unit 7. When the ambient light sensor 70 senses that the ambient light is of a first dim grade, the ambient light enhancement comparing unit 7 is activated, to compare the 3-dimension stereoscopic relief images 5 of the object-to-be-tested 90, with the 3-dimension stereoscopic relief reference images 65 of the original object 60 fetched by infrared light of wavelength 940 nm, and when the ambient light sensor senses the ambient light is of a second dim grade, then the ambient light enhancement comparing unit 7 is switched automatically, to compare the 3-dimension stereoscopic relief images 5 of the object-to-be-tested 90, with the 3-dimension stereoscopic relief reference images 65 of the original object 60 fetched by infrared light of wavelength 850 nm, and finally the illumination of the ambient light is adjusted automatically to obtain a more precise image recognition.

Figure 8:
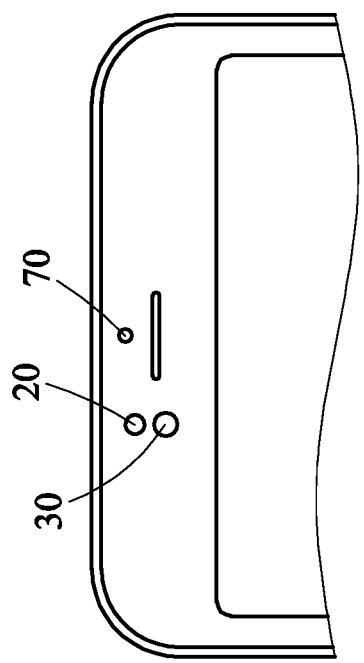
FIG. 8 is a schematic diagram of a recognition system utilized in an intelligent handset according to the present invention.

In the descriptions above, the recognition hardware mechanism 1 can be installed on the intelligent mobile device, such as intelligent handset, tablet etc, but the present invention is not limited to this. In practice, the recognition hardware mechanism 1 can also be installed on a desk top computer, or a notebook computer. As shown in FIG. 8, in realizing human face recognition on an intelligent handset, it only requires to use a structure formed by a single-piece multi-frequency light-emitting-diode 20, a single-piece multi-frequency image sensor 30, and an ambient light sensor 70. Compared with the existing iPhoneX handset of Apple, The whole outfit thus formed is able to save cost and space, while the entire recognition precision is raised significantly.

Further, refer to FIG. 3 for a block diagram of a recognition system according to the present invention. As shown in FIG. 3, in order to obtain more precise recognition, in addition to the face recognition mentioned above, eye iris can be added to enhance precision of recognition. In this approach, two biological characteristics are combined to provide higher degree of recognition precision.

As shown in FIGS. 4 and 5, in the present invention, in order to achieve better recognition, the image signal formed by superimposing the wide range image signal 305 and at least two narrow range image signals 301, 302 is used, to realize clearness of layers and to give a sense of depth and layer. And this can be used to calculate precisely the 3-dimension characteristics of the object-to-be-tested 90, such as distance of depth, gesture of hand, getting around obstacle, etc. That is quite important for 3-dimension image depth and distance measurement applications, such as Virtual Reality/Augmented Reality (VR/AR), drone, people/things counting. Further, it is capable of performing depth measurements for object-to-be-tested 90 and its surroundings. As such, the technology of the present invention can also be used in the fields of Artificial Intelligence (AI), and Computer Vision. For example, the recognition hardware mechanism 1 can be installed in a vehicle, and is used for face recognition door opening for an automobile, or fatigue detection for a motor cyclist, but the present invention is not limited to this.

Figure 9:
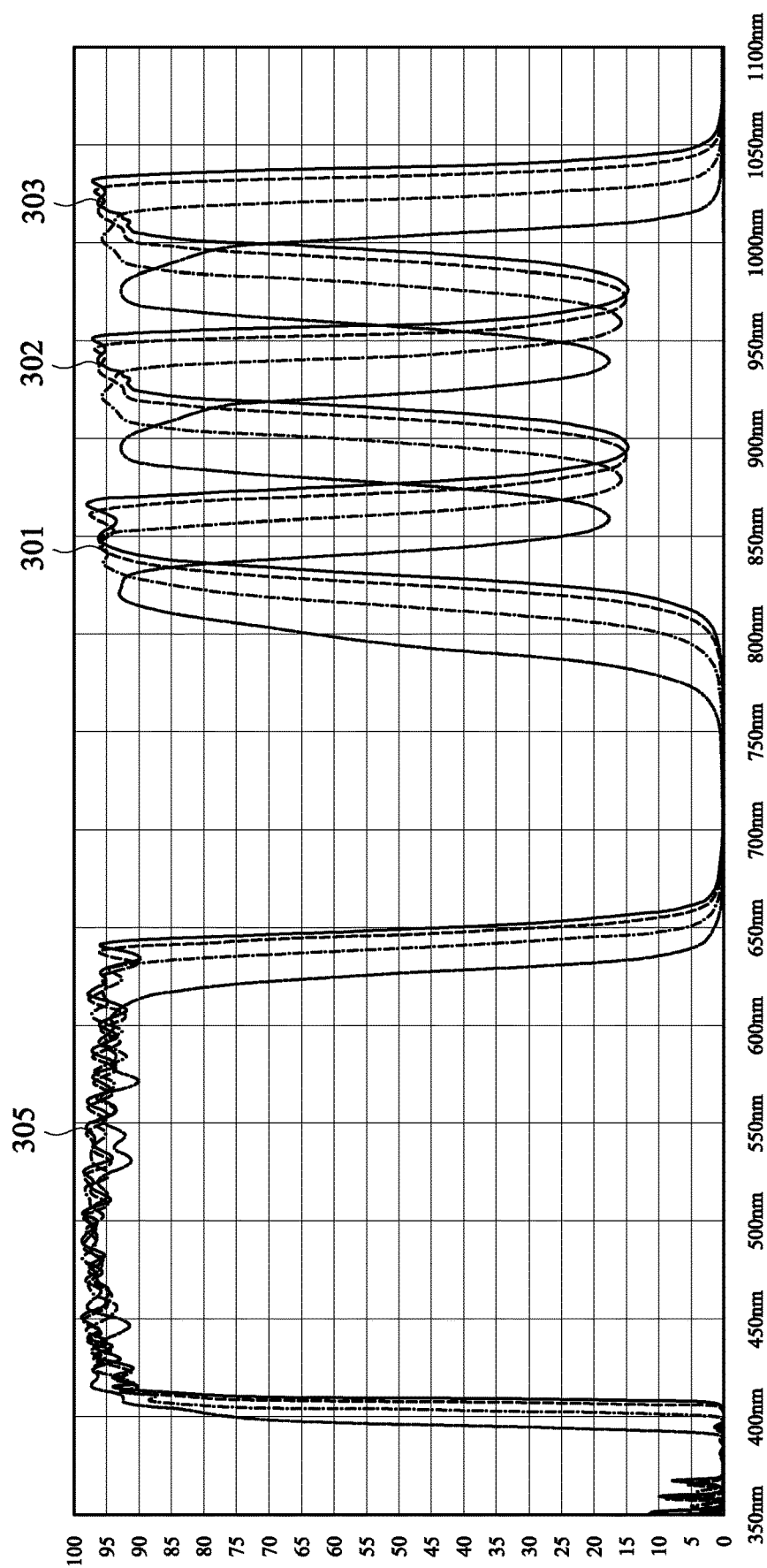
FIG. 9 is another spectrum diagram of image signals received by a single-piece multi-frequency image sensor according to the present invention.

Moreover, as shown in FIGS. 4 and 9, in the present invention, the image enhancing processor unit 312 can be realized through a software or a firmware, to facilitate revising or increasing the amount of the narrow range image signals captured, or adjusting the transmittance of the image signal to a range between 30% and 95%. For example, in image fetching, an additional narrow range image signal 303 of wavelength 1050 nm can be added. As such, through superimposing three narrow range image signals of infrared light of wavelengths 850 nm, 940 nm, 1050 nm, the recognition depth and sense of layer can be more evident, to raise effectively the clearness and stereoscopic sense of the image.

In the descriptions above, one narrow range image signal is added, however, the present invention is not limited to this. In fact, the amount of narrow range image signals added can be classified into various grades corresponding to different recognition precisions. As such, it can be customized to recognize the object-to-be-tested 90 as a biological or a non-biological real entity, and be used extensively in various applications, such as security monitoring, industrial monitoring, face recognition, webcam, drone, robot, and vehicle backup auxiliary image fetching.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A multi-frequency high-precision object recognition method, comprising the following steps:
   providing a recognition hardware mechanism contained in a recognition system, the recognition hardware mechanism having at least a multi-frequency light emitting unit and at least a multi-frequency image sensor unit;
   irradiating lights of different frequencies emitted by the at least a multi-frequency light emitting unit onto an object-to-be-tested, the lights emitted by the multi-frequency light emitting unit contains at least two infrared lights, having their wavelength ranges between 850 nm to 1050 nm;
   fetching by the multi-frequency image sensor unit images of the object-to-be-tested irradiated by lights of different frequencies, such that the multi-frequency image sensor unit fetches respective narrow range image signals contained in the at least two reflected infrared lights respectively, the wavelength ranges of the narrow range image signals are between 850 nm to 1050 nm corresponding to that of the multi-frequency light emitting unit, and a wavelength width for each of the infrared lights is at least 10 nm to 60 nm;
   locating in an X axis and a Y axis is a single-piece planar image, and in a Z axis is image depths of different wavelengths, wherein a sample wavelength in the Z axis contains at least two infrared light narrow range image signals, and their wavelength ranges are between 850 nm and 1050 nm, corresponding to that of the multi-frequency image sensor unit, the wavelength width for each of the infrared lights is at least 10 nm to 60 nm; and
   calculating to obtain a plurality of single-piece planar images in the X axis and the Y axis as sampled by different wavelength widths in the Z axis, superimposing the plurality of single-piece planar images into a 3-dimension stereoscopic relief image for precise comparison and recognition.

2. The multi-frequency high-precision object recognition method as claimed in claim 1, wherein the multi-frequency image sensor unit is formed by a plurality of image sensors of different frequencies or a single-piece multi-frequency image sensor, the single-piece multi-frequency image sensor includes:
   a light sensing pixel array;
   a packaging circuit, connected to the light sensing pixel array, to drive the light sensing pixel array to capture outside light and convert it into a combined image signal for output, the light sensing pixel array captures RGB full color visible light, and IR infrared invisible light to perform photoelectric conversion; and
   an image enhancing processor unit, embedded in the packaging circuit, to control and regulate image captured by the light sensing pixel array, the image includes: a full color RGB visible light wide range image signal having its wavelength range between 400 nm and 700 nm, and at least two infrared invisible light narrow range image signals and having their wavelength ranges between 850 nm and 940 nm, a wavelength width for each of the two infrared invisible light narrow range image signals is between 10 nm and 60 nm, the full color RGB visible light wide range image signal and the two infrared invisible light narrow range image signals are superimposed and combined, to produce a clear output image having a stereoscopic sense of a front layer and a back layer.

3. The multi-frequency high-precision object recognition method as claimed in claim 1, wherein the multi-frequency light emitting unit is formed by a plurality of light-emitting-diodes of different frequencies or a single-piece multi-frequency light-emitting-diode, the single-piece multi-frequency light-emitting-diode emits at least two infrared lights with their wavelength ranges between 850 nm and 1050 nm.

4. The multi-frequency high-precision object recognition method as claimed in claim 1, wherein the object-to-be-tested is a biological or non-biological real entity, a preliminary recognition learning unit is provided, to utilize the two infrared light narrow range image signals with wavelength of 850 nm and 940 nm respectively, to take at least an image for an upper portion, a lower portion, a central portion, a left portion, and a right portion respectively of an original object, and to take at least an image of the original object when it moves in every other angle in cross transposition, calculate to obtain a plurality of single-piece planar images in the X axis and the Y axis, as sampled by infrared lights of different wavelengths of 850 nm and 940 nm respectively in the Z axis, and superimpose the plurality of single-piece planar images into a 3-dimension stereoscopic relief reference image for subsequent comparison and recognition.

5. The multi-frequency high-precision object recognition method as claimed in claim 4, wherein in executing a preliminary recognition learning unit, an interrupted sound or voice is produced, to serve as a reference indication for angular displacement speeds of the original object moving upward, downward, to the center, to the left, and to the right.

6. The multi-frequency high-precision object recognition method as claimed in claim 4, wherein in completing the 3-dimension stereoscopic relief images of the object-to-be-tested, firstly, determine if the object-to-be-tested is a real entity, in case it is, compare the 3-dimension stereoscopic relief images of the object-to-be-tested, with the 3-dimension stereoscopic relief reference image of the original object stored in the preliminary recognition learning unit, to determine if they are identical, in case it is identical, activate connection to work, otherwise not activate the connection.

7. The multi-frequency high-precision object recognition method as claimed in claim 4, wherein the recognition hardware mechanism further includes an ambient light sensor, and a corresponding ambient light enhancement comparing unit is provided, when the ambient light sensor senses the ambient light is of a first dim grade, the ambient light enhancement comparing unit is activated, to compare the 3-dimension stereoscopic relief images of the object-to-be-tested, with the 3-dimension stereoscopic relief reference images of the original object fetched by infrared light of wavelength 940 nm, and when the ambient light sensor senses the ambient light is of a second dim grade, then the ambient light enhancement comparing unit is switched automatically, to compare the 3-dimension stereoscopic relief images of the object-to-be-tested, with the 3-dimension stereoscopic relief reference images of the original object fetched by infrared light of wavelength 850 nm, and finally the illumination of the ambient light is adjusted automatically to achieve a precise image recognition.

8. The multi-frequency high-precision object recognition method as claimed in claim 1, wherein the object-to-be-tested is a human face.

9. The multi-frequency high-precision object recognition method as claimed in claim 1, wherein the object-to-be-tested is a human face or a human eye iris.

10. The multi-frequency high-precision object recognition method as claimed in claim 1, wherein the recognition hardware mechanism is installed on an intelligent mobile device.

11. The multi-frequency high-precision object recognition method as claimed in claim 1, wherein the recognition hardware mechanism is installed on a vehicle.

* * * * *